(12) United States Patent
Lill et al.

(10) Patent No.: US 6,226,226 B1
(45) Date of Patent: May 1, 2001

(54) METHOD FOR VEHICLE DATA DEPENDENT RANGE MEASUREMENT FROM A VEHICLE

(75) Inventors: Anton Lill, Lauffen; Jochen Kiemes, Stuttgart; Joachim Mathes, Heilbronn, all of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/297,562

(22) PCT Filed: Oct. 2, 1997

(86) PCT No.: PCT/EP97/05425

§ 371 Date: Jul. 1, 1999

§ 102(e) Date: Jul. 1, 1999

(87) PCT Pub. No.: WO98/20364

PCT Pub. Date: May 14, 1998

(30) Foreign Application Priority Data

Nov. 4, 1996 (DE) .............................................. 196 45 339

(51) Int. Cl.[7] .................................................. G01S 15/00
(52) U.S. Cl. ................................................................ 367/98
(58) Field of Search ............................ 367/98, 900, 909; 342/70, 205

(56) References Cited

U.S. PATENT DOCUMENTS

| 4,132,991 | * | 1/1979 | Wocher et al. ....................... 342/205 |
| 4,308,536 | * | 12/1981 | Sims, Jr. et al. ....................... 342/70 |
| 5,319,611 | | 6/1994 | Korba ..................................... 367/98 |

FOREIGN PATENT DOCUMENTS

| 34 05 915 | 8/1985 | (DE) . |
| 36 37 165 | 5/1988 | (DE) . |
| 40 32 713 | 4/1991 | (DE) . |
| 42 08 595 | 5/1993 | (DE) . |
| 43 35 801 | 4/1994 | (DE) . |
| 43 38 244 | 5/1994 | (DE) . |
| 43 35 728 | 4/1995 | (DE) . |
| 195 10 910 | 9/1995 | (DE) . |
| 0 726 473 | 8/1996 | (EP) . |

* cited by examiner

Primary Examiner—Daniel T. Pihulic
(74) Attorney, Agent, or Firm—J. Gordon Lewis

(57) ABSTRACT

The invention concerns an ultrasound parking aid system which emits warning signals when an echo signal lying within an audibility window exceeds a given threshold value. Hitherto, an audibility window or the sensitivity of the system was adapted to fixed data of the vehicle and/or the roadway. According to the invention, the sensitivity, audibility window or even the emission response is adapted as a function of varying dynamic data of the vehicle or roadway.

5 Claims, 2 Drawing Sheets

METHOD FOR VEHICLE DATA DEPENDENT RANGE MEASUREMENT FROM A VEHICLE

Figure 1:
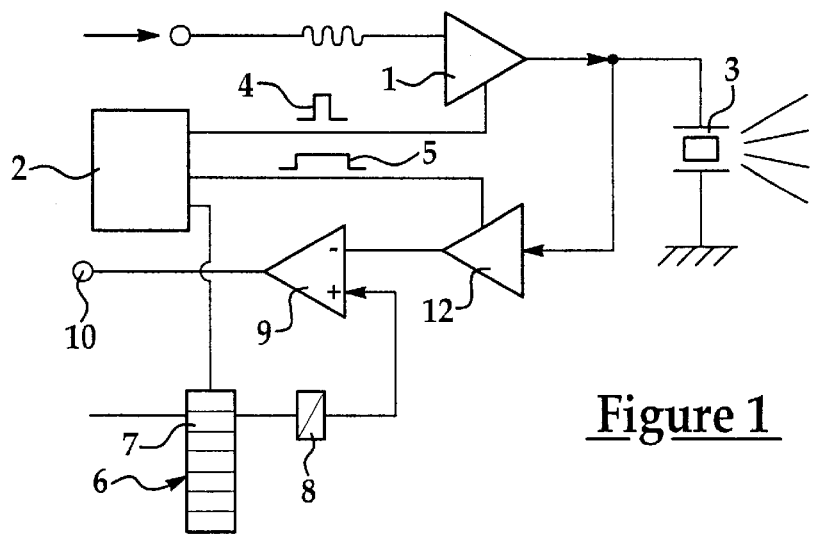

The invention pertains to a method for range measurement of obstacles from a vehicle with the aid of an echo method, preferably, an ultrasonic method. In this method, a transmitted signal is reflected to the vehicle from the illuminated object in the form of an echo and, in the vehicle, a warning signal is triggered during a temporal listening window, as a function of the threshold value of a receiver. In connection with this type of method, it is known to blank out certain echoes that do not represent a danger to the vehicle in order to avoid false warnings. These may be, for example, pavement echoes from certain pavement structures. In addition, it is known to evaluate only those echoes that appear during a certain time period. While, on one hand, a certain amount of settling time of the transmitted signal must pass before echoes can be evaluated, on the other hand, it makes little sense to evaluate echoes with a very large travel time, since the latter come from objects at a great distance, which do not represent a danger to the vehicle. Consequently, this so-called listening window can monitor a comparatively large spatial depth in time. However, the listening window also can be very restricted in time so that a spatial segment of only little depth is monitored. Other ways of changing the monitoring behavior of said type of monitoring system are shortening or lengthening the transmission period and/or increasing the transmitter power. As a rule, a greater transmitter power also requires a greater transmission period, since settling times and decay times must be observed.

References to the described method may be obtained, e.g., from DE-OS 3,937,585. Also, it is known to change the sensitivity threshold of the receiver during the chronological progression of the listening window. In principle, this method proceeds in such a way that the threshold is increasingly lowered for echoes with a longer travel time until, finally, the listening window is closed. One reason for this is because pavement echo appears at a relatively limited distance from the vehicle. This comparatively simple curved path of the timing progression of the listening window as a function of time achieves a pavement echo that does not lead to a warning signal with range measurement. Nevertheless, it is a disadvantage because the sensitivity of the range measurement always should be as great as possible, even in the near range located between the transmitter and pavement echo. Nonetheless, within this region, projections of the vehicle, such as a trailer coupling, may still cause a warning signal.

A similar consideration relates to the fact that triggered warning signals are of different significance for the driver. If an obstacle is detected behind the tail of a car, this is of relatively limited significance if the driver is traveling forward. The reaction is similar if the driver is traversing a curve Here, among other things, warning signals are triggered that relate to obstacles that, based on the steering angle of the vehicle, the driver will never reach. In addition, indications of far distant obstacles are comparatively insignificant if the driver is driving particularly slowly, while, for more rapid travel, such warnings may be entirely meaningful. Conversely, even weak echoes may be significant to the driver if they come from an area of the surroundings of the vehicle into which it is traveling based on its steering angle, but which it would never reach if it was traveling straight ahead.

Therefore, the invention starts from a method of the class obtained from the preamble of claim 1. The purpose of the invention is to adapt the procedure of range measurement to the parameters of the vehicle. The problem is solved by means of the combination of features obtained from the characterizing clause of claim 1. A suitable way can then be following according to the indicated teaching. With respect to spatial data (parameters) of the vehicle, one may proceed, e.g., such that although the listening window remains open in the very near range, the threshold is adapted for an echo coming from near range. Then it is no longer true that the threshold rises steadily as the distance to the vehicle decreases; the threshold also may decrease again or reverse its direction several times. Thus, e.g., it can be that raising the threshold within a certain time domain of the listening window blanks out ground return, then upon further nearing the vehicle, the threshold is again lowered and then finally, at a close proximity to the vehicle (trailer coupling) the threshold is once again raised within a short range. In this way, the threshold progression in the measuring system can remain in a fixed setting; it can, however, also change as a function of spatial data of the vehicle. Thus, e.g., a change in reflected echoes is to be expected if the tail of the vehicle is lowered due to a great load or raised due to an unloaded state. Since the speed of sound changes with temperature, changes in echo behavior also may appear. With the use of several transmitters, receivers, or transducers arranged next to each other on the bumper, one may proceed, in an advantageous refinement of the invention, in such a way that the position and duration of the listening window changes or the measured length of at least some of the transducers decreases. If, for example, the front wheels are set at a certain angle, it is not necessary to measure the far range on the side of the vehicle that will not reach this far range based on the relative position of the steering wheels. Here, for example, the listening window may end earlier. Conversely, it can be recommended to enlarge the listening window on the opposite, endangered, side and/or to increase the transmitter power. In addition, other data relating to the dynamics of vehicle movement may be used in order to change the measuring parameters of the range measurement. This data may be, e.g., acceleration of the vehicle, velocity, change of the steering angle or the like. This applies, more specifically, to an echo measuring device that measures the distance to the vehicle traveling in front.

In addition, the invention indicates different range measurement devices that are particularly suited for carrying out the method of the invention. In this connection, especially the range measures are emphasized, which operate as measuring devices using an ultrasonic method. However, the principle of the invention also may be applied analogously to other echo methods, operating, e.g., with infrared, radar or laser irradiation. In this respect, claims that are oriented to range measurement devices are to be understood as examples only and shall not represent a restriction of the invention to ultrasound. The characteristics cited in the claims also may be combined with each other in a suitable way as a function of the respective application. In this connection one must keep in mind the fact that individual measures mutually support each other. In this connection, a threshold, e.g., which has been raised to a very large value, acts as an interruption of the listening window. On the other hand, it does not make sense to increase the transmitter power in order to detect echoes with a larger travel time if the listening window is not correspondingly expanded. It also is possible, instead of increasing the input threshold to an extreme level, to briefly interrupt the listening window. This measure comes into question if it is easier to control the listening window than to control the threshold.

Figure 2:
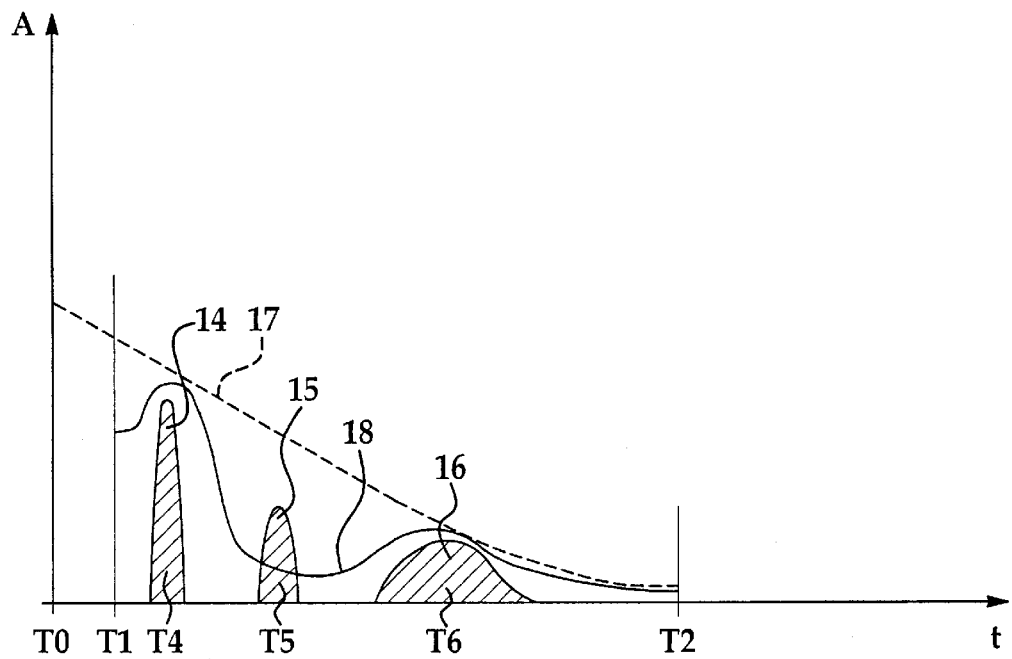
Figure 3:
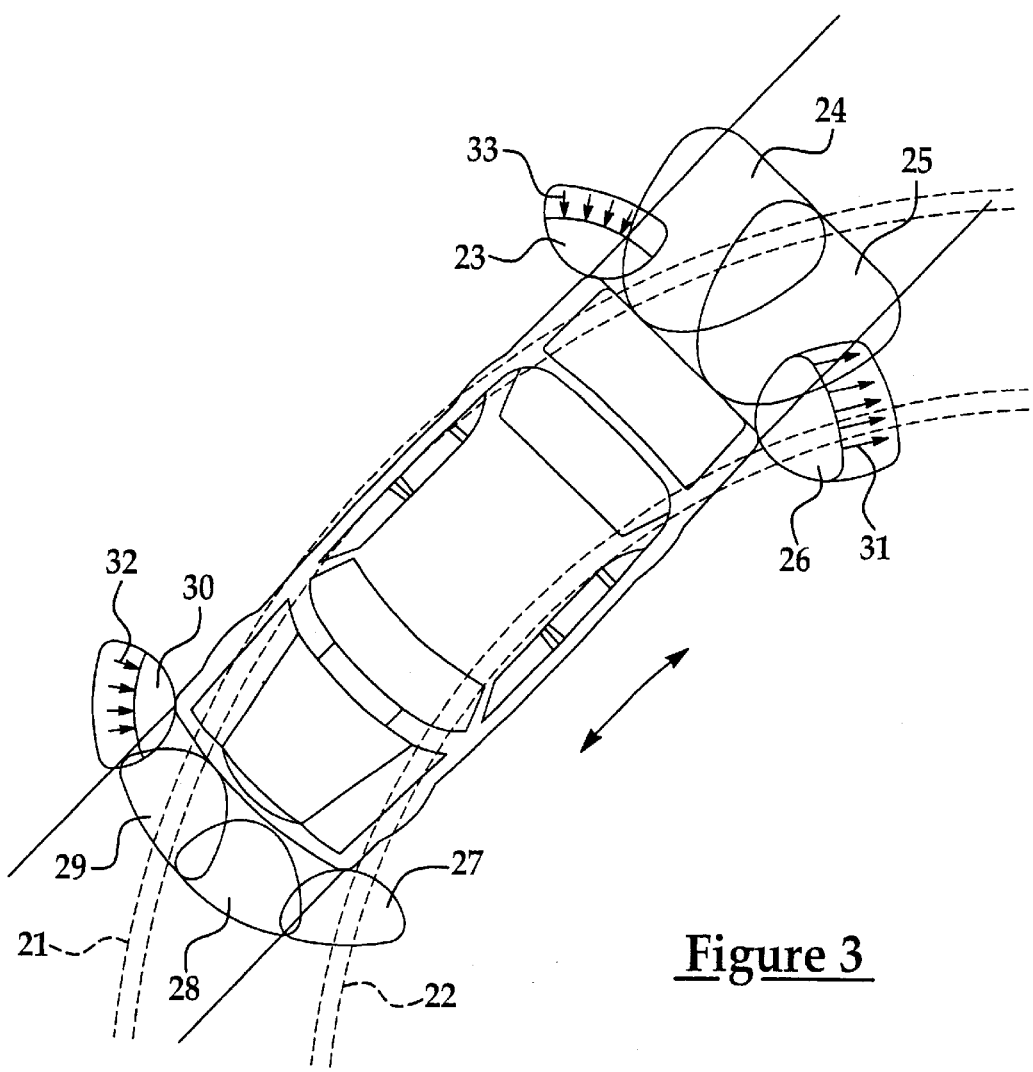

An embodiment of the invention is explained in the following with the aid of the drawings shown are:

FIG. 1, in partial symbolic representation, the principle procedure of a range measurement device that operates with ultrasound FIG. 2, the dependence of noise echoes on the travel time of the echoes and FIG. 3, the measuring range that is important for a vehicle during curved travel.

In FIG. 1, a frequency suitable for a transducer is fed to a transmitter amplifier (1). The amplifier (1) is turned on, as a function of the control signal of a control unit (2), such that the transducer (3) begins to transmit for a certain transmission period (4). In this connection, it must be taken in consideration that the transmission period not completely agree with the oscillation period, since the transducer possesses a transient recovery time and a decay time. After the transmitter signal has been emitted from the transducer (3), which operates both in the transmitting direction and the receiving direction, and the amplifier (1) has been turned off, after the decay time of the transducer (3) has ended, the receiver amplifier (12) is turned on, which amplifies the signal emitted by the transducer (3) and feeds this signal to a comparator (9). The receiver amplifier is open during a so-called listening window; this is the time range in which echoes from a possible obstacle (while parking) are expected. The time of the listening window (5) is controlled, in turn, by means of the control unit (2). Simultaneously, the control unit steps through a memory (6), which stores threshold values in the form of digital values in its individual memory locations (7). Said digital threshold values are converted into analog signals by means of a digital/analog converter (8) and, just as the signals of the receiver amplifier (12), are fed to the comparator (9). The comparator emits an output signal that becomes a warning signal only if the output value of the receiver amplifier (4) is greater than the threshold value at the output of the digital-analog converter (8).

Consequently, it is recognizable that the procedure of the range measurement device is determined both by means of the transmission period (4), the receiving period (5) (listening window) and the size of the threshold values in the memory (6). This allows the procedure of the range measurement device to be adapted extensively to existing needs.

FIG. 2 shows a possible way for the amplitude of the echo received from the transducer (3) to be dependent on the travel time. This way originates at the instant (T0) at which the transmission period (4) ends. Then, one must wait until the instant (T1), at which time the transmitted signal of the transducer (3) has decayed. Then a listening window begins at the instant (T1) and the listening window continues to the instant (T2), i.e., within this period, the control unit (2) switches on the receiver amplifier (12). It is assumed that the transducer receives the echo (14) of the trailer coupling of the vehicle at the instant (T4), the echo (15) of an obstacle at the instant (T5) and the ground return at the instant (T6). In this connection, the travel times of the echoes (14, 16) remain essentially equal, while the instant (T5) is a function of the distance from the vehicle to the obstacle. The curve (17) now shows a previously used progression of the threshold value through the travel time. According to this, the threshold increases steadily as the travel time decreases, hence, from (T2) to (T1). After (T2), the listening window ends, because expected echoes would be very weak and also would be located outside the important warning area. In accordance with the invention, one now proceeds such that, as is evident from the curve (18), the threshold no longer only rises steadily, but also falls, in order also to be able to detect weaker signals in an important section of the monitoring range. This can be seen, e.g., by the echo (15) at (T5), which would not have been detected with the previously used threshold curve, while said obstacle is detected by means of the new progression of the threshold curve. Nevertheless, the curve (18) blanks out echoes (14,16), which are undesirable for evaluation, by means of a corresponding increase in the threshold.

FIG. 3 shows a vehicle (20) as it is cornering. The future course of the tire tracks (21,22) is indicated in FIG. 3 for forward or reverse travel. The vehicle is provided with four transducers on the front and rear bumper respectively, with the beams (23–30) being indicated. Now it can be seen that it is advantageous to enlarge the listening window or to extend the measuring range at the edge (26) of the region that will be traversed by the vehicle. This is indicated with respect to the transducer beam (26) by means of arrows (31), which expand said beam. In contrast, it makes sense to correspondingly decrease the measuring range for the beams (23,30) that are indicated by means of corresponding arrows (32,33). As described above, however, other measures are possible. As mentioned, this type of change of the measuring range also can be undertaken if the vehicle is heavily loaded or completely unloaded. Additional data relating to the dynamics of vehicle movement such as traveling velocity, steering angle, or change of steering angle, direction of travel and the like, likewise, may lead to an adaptation of the corresponding measuring ranges or beams.

In summary, the invention may be described as follows: as a function of the configuration of the vehicle or else of loading states, etc., there are different sources of noise (e.g., flour of mounted parts such as trailer coupling) that produce echo signals of, in each case, specific distances and amplitudes. Moreover, it may be desirable to purposefully shape the detection range (i.e., local expansion or contraction).

All of these points may be solved, to advantage, if the sensitivity of the system does not steadily increase with distance. This was the earlier procedure, in order to imitate the reflecting behavior of a standard obstacle. In the near range, a maximum sensitivity is sensible if it is adapted to the distance from the pavement surface, and to mounted parts such as trailer couplings and the like. Above all, in the middle distance range it is appropriate, as a function of the fitting position of the transducers, to blank out patterns of reflection produced by means of uneven pavement surfaces, by means of purposefully lowering the sensitivity.

In order to influence sensitivity, the threshold of the comparator is digitized by means of a number of support locations and filed in a memory (in the transducer and/or in the control unit). Converted back to analog form, it determines the behavior of the transducer during measurement; this can be adapted optimally for each transducer.

The threshold can be varied again and again (e.g. exchanging transducers to another vehicle, changes of the operating mode—e.g., reception only, without a preceding transmission enables greater sensitivity, changing the state of loading—distance and angle to the pavement surface). Said changes may be carried out during maintenance of the vehicle, during operation, e.g., by means of data obtained by means of bus interfaces or by means of a self-learning system.

Naturally, it is also possible to vary in time, instead of the threshold, an amplification factor with exactly the same effects as described above.

However, it is also possible, instead of varying the threshold, to digitize the measuring signal (with an A/D converter) and, in the control unit, to distinguish between desirable and undesirable echoes by means of a digital comparison (or another suitable method).

What is claimed is:

1. A method for range measurement of obstacles from a vehicle with the aid of an echo method, in which a transmitted signal is reflected by a signal illuminated object to the vehicle in the form of an echo, and, in the vehicle, a warning signal is triggered during a timed listening window as a function of a threshold value of a receiver, characterized by the steps of:

making one of the time position and the duration of the transmitted signal and the progression of the threshold value in time during the listening window a function of spatial parameters of the vehicle, the spacial parameters describing at least one of the spacial dimensions, and the movement of the vehicle, and the state of the vehicle.

2. A range measurement device for range measurement of obstacles from a vehicle using an echo method in which a transmitted signal is reflected by a signal illuminated object to the vehicle in the form of an echo, the device comprising:

at least one electro-acoustical transducer for emitting an ultrasonic signal and subsequently receiving an ultrasonic signal reflected from the object, having a receiving stage for echo signals detected by the transducer and a control unit which sets the transmission period of the transducer, a subsequent settling time of the transducer, a listening window for reception of reflected echo signals and, a dead reception time until the next activation of the transducer, a threshold circuit provided in the receiving stage, the threshold circuit possessing a time-dependent threshold value during the duration of the listening window which causes a warning signal only if the receiving value exceeds a certain threshold value, at least one of the transmission period and the transmitting power of the transducer, and the duration and the position of the listening window, and the time-dependence of the threshold value is a function of the parameters relating to at least one of the dynamics of vehicle movement and the spatial parameters of the vehicle.

3. The measuring device of claim 2, characterized in that several transducers are provided and at least one of the position and the duration of the listening window and the transmission period and the transmitting power of the individual transducers is a function of one of the stopped position of the wheels and the angular change of the turning-angle of the steering wheels.

4. The measuring device of claim 3, characterized in that the threshold value of the threshold value circuit and the expansion value of the amplifier is a function of the travel time, in such a way that it is held as low or high as possible and, as a function of travel time, is raised or lowered only at locations at which the echo appears from objects that should not initiate a warning signal or are outside of a desired warning range.

5. The measuring device of claim 3, characterized in that at least one of the transmission duration and the transmitting power of the transducer and the duration and the position of the listening window is a function of the vehicle velocity of the measuring vehicle.

* * * * *